Figure 1:
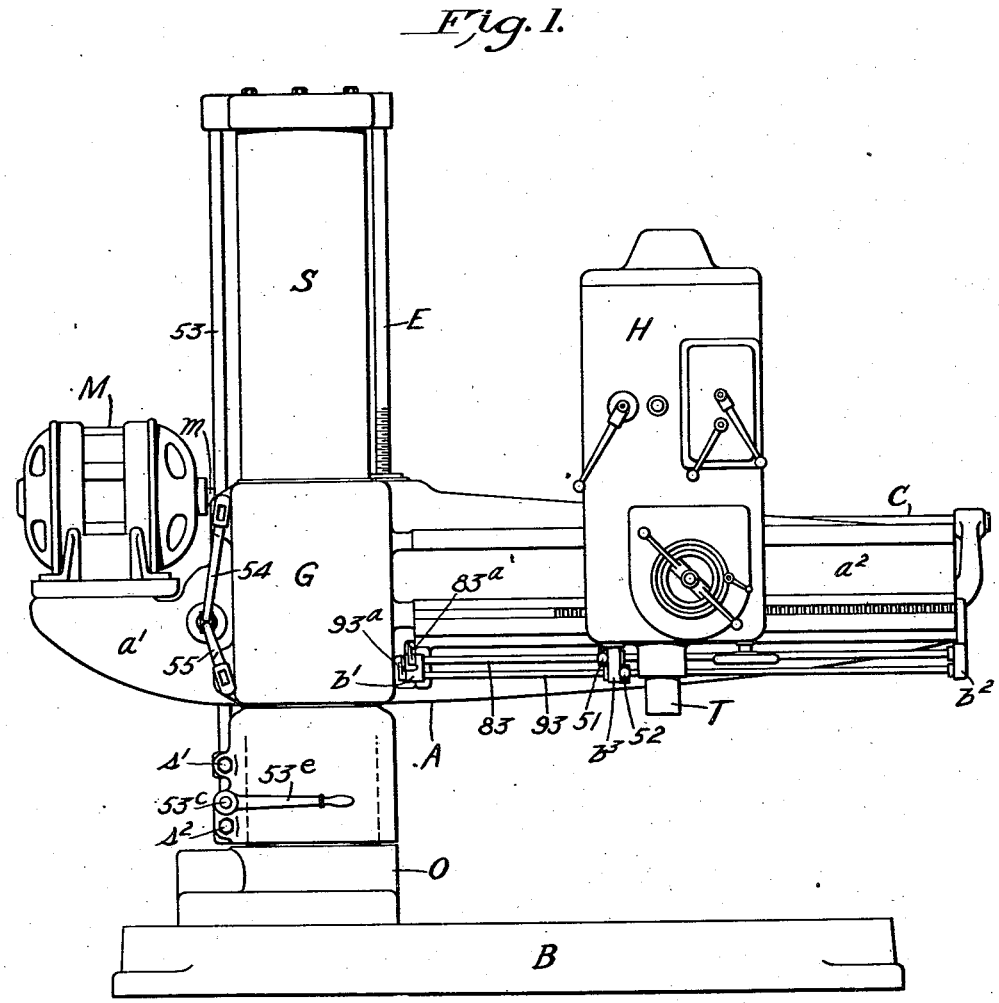

Nov. 5, 1935.  L. L. SCHAUER ET AL  2,019,509
HYDRAULIC COLUMN AND ARM CLAMP WITH ELEVATING CONTROL
Filed June 4, 1932   10 Sheets-Sheet 1

Inventors
Lawrence Lee Schauer
Augustus M. Sosa
By Attorneys
Nathan, Bowman & Helferich

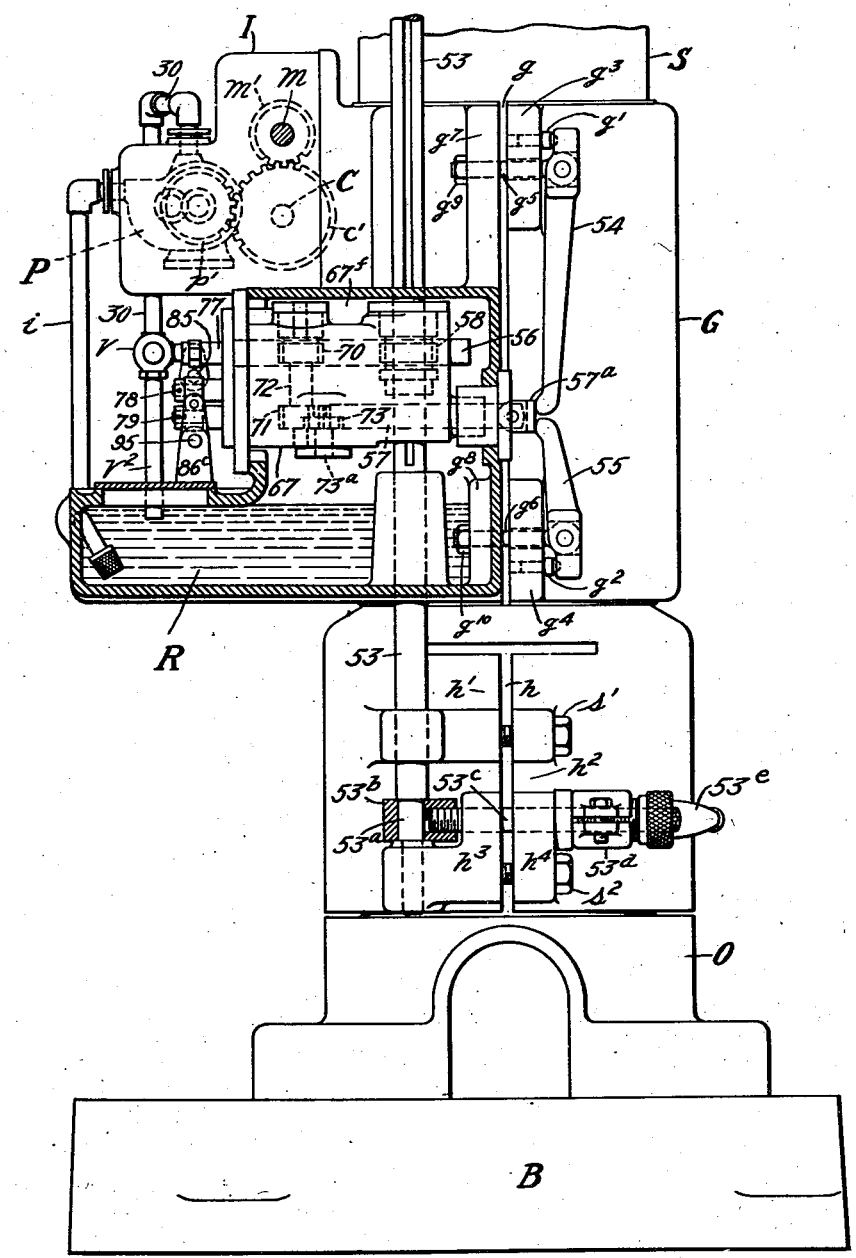

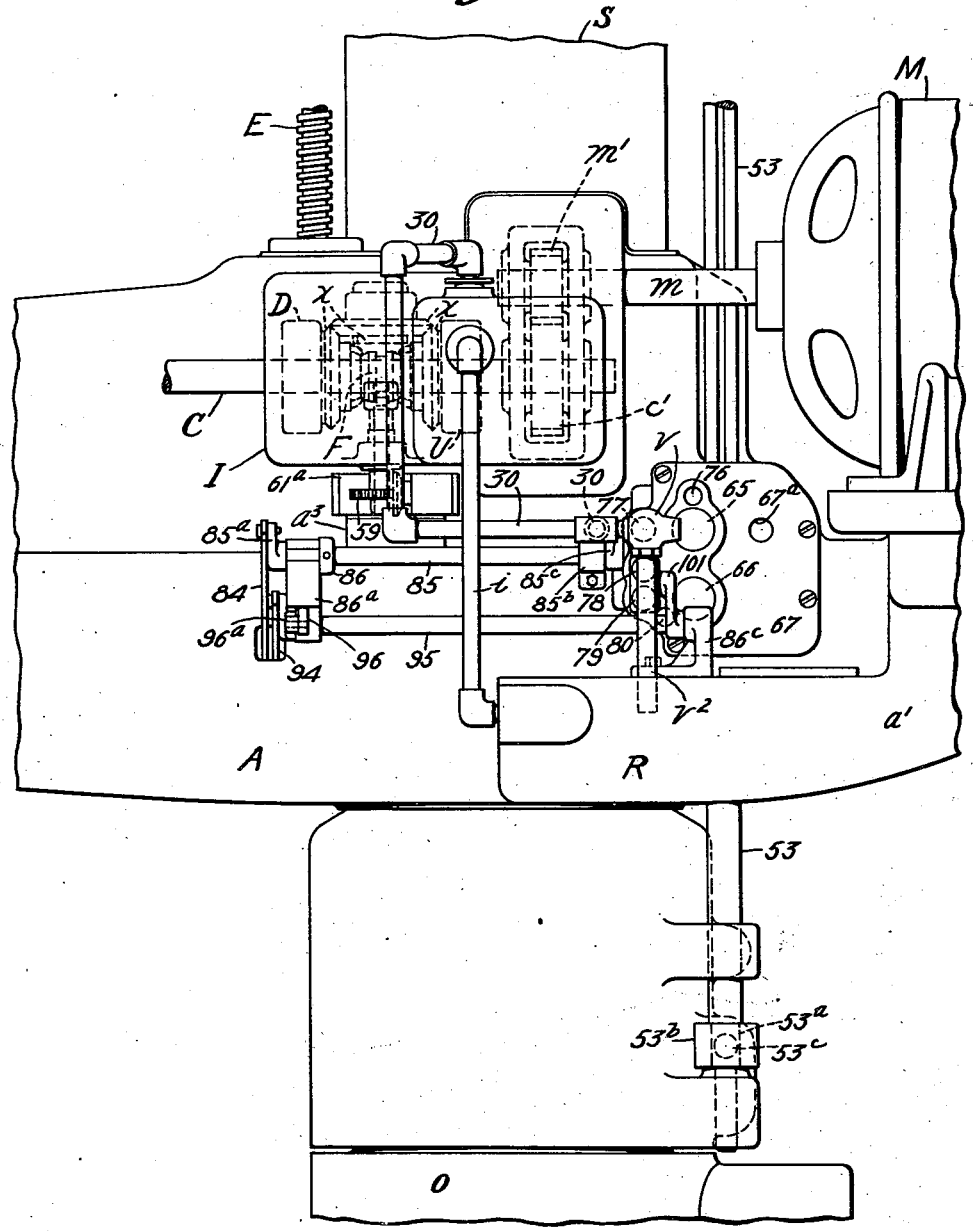

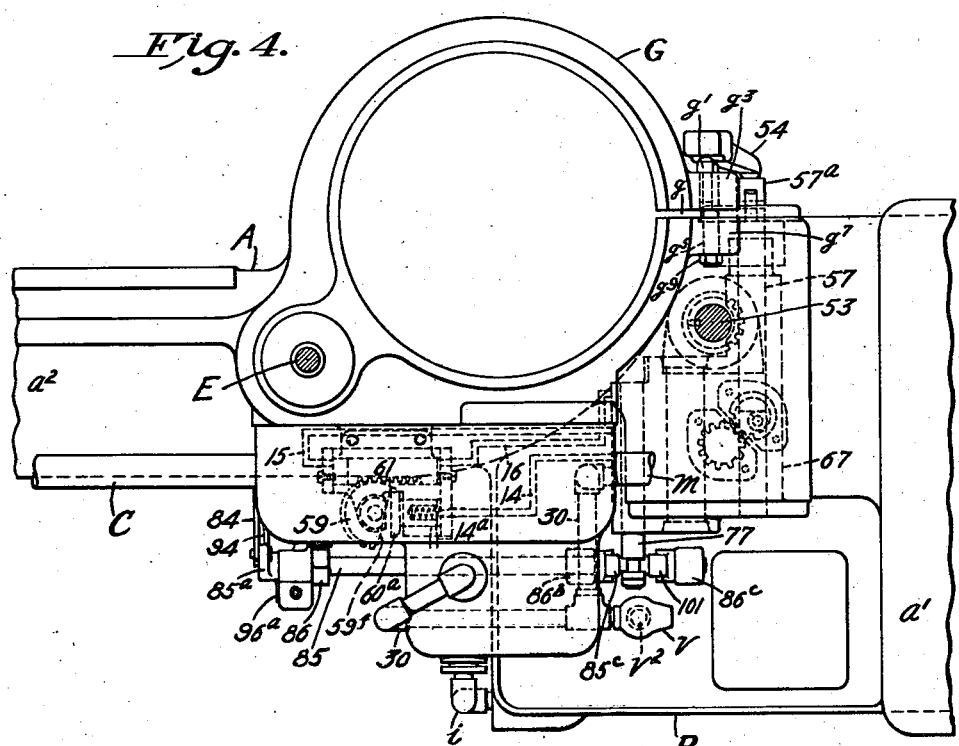
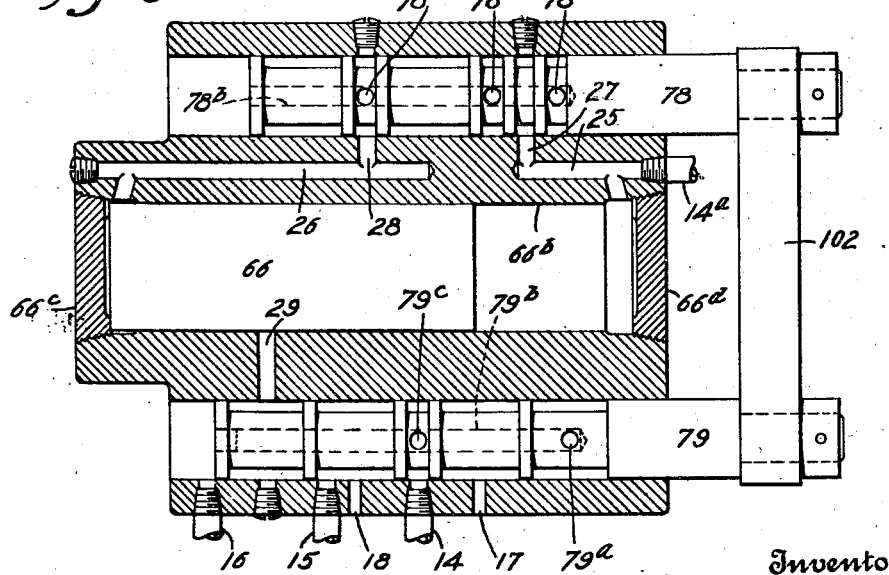

Nov. 5, 1935.  L. L. SCHAUER ET AL  2,019,509
HYDRAULIC COLUMN AND ARM CLAMP WITH ELEVATING CONTROL
Filed June 4, 1932
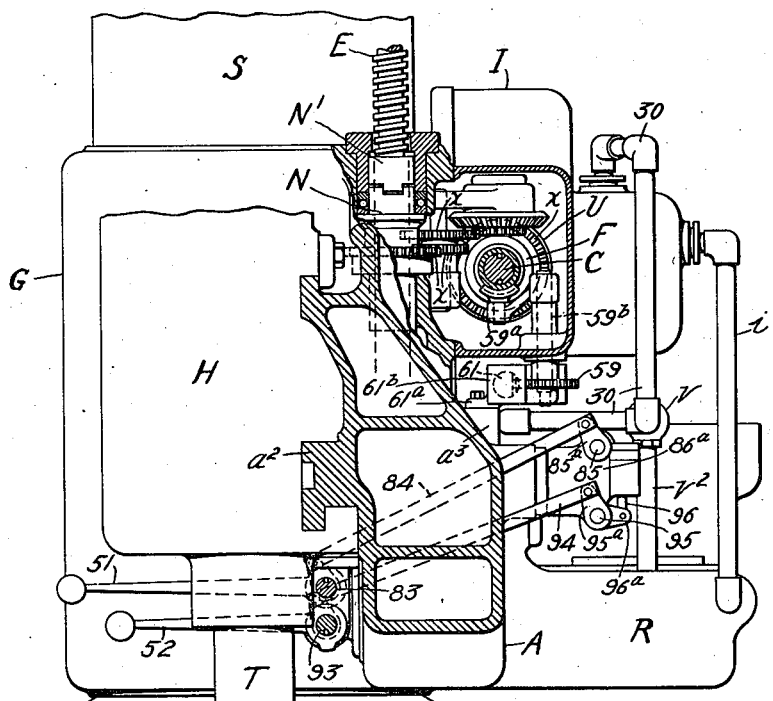
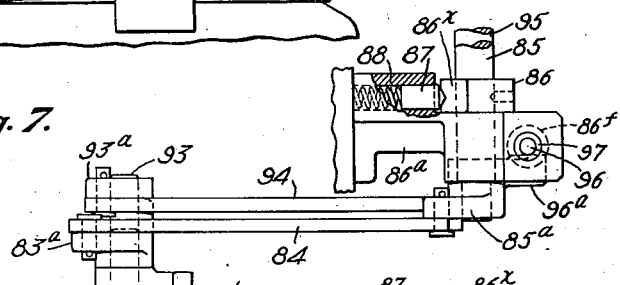
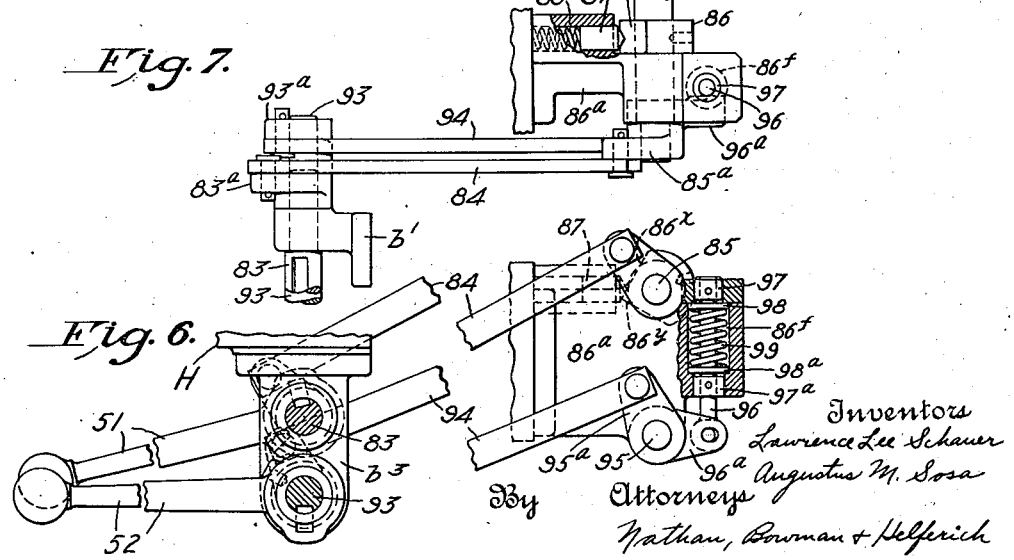

Nov. 5, 1935. L. L. SCHAUER ET AL 2,019,509
HYDRAULIC COLUMN AND ARM CLAMP WITH ELEVATING CONTROL
Filed June 4, 1932 10 Sheets-Sheet 10

Patented Nov. 5, 1935

2,019,509

UNITED STATES PATENT OFFICE 2,019,509

HYDRAULIC COLUMN AND ARM CLAMP WITH ELEVATING CONTROL

Lawrence Lee Schauer and Augustus Marius Sosa, Cincinnati, Ohio, assignors to The Cincinnati Bickford Tool Company, Cincinnati, Ohio, a corporation of Ohio Application June 4, 1932, Serial No. 615,328

21 Claims. (Cl. 77—28)

This invention relates to machine tools and more specifically to means for actuating certain elements thereof.

A radial drill is a good example of a machine tool to which this invention advantageously may be applied and the invention will, therefore, be disclosed as embodied in that type of machine tool but it is to be understood that the invention is not limited to this embodiment.

In its more limited aspects the invention relates to hydraulically actuated means for clamping the sleeve of a radial drill to its supporting column, means for translating the usual radial arm vertically on said sleeve and hydraulically actuated mans for clamping the arm to the sleeve in all of its positions of adjustment.

One of the objects of this invention is to provide improved hydraulic means for effecting clamping of the sleeve and arm.

Another object is to provide an hydraulic control for the reversing clutch which determines whether the arm shall be translated upwardly or downwardly on its supporting sleeve.

Still another object is so to coordinate and combine the arm translating means with the arm clamping means that the arm shall be clamped automatically when it is brought to rest after a vertical adjustment, thus relieving the operator of the separate operation of clamping the arm and insuring against operation of the machine with the arm unclamped.

A further object of this invention is to provide an hydraulic interlock between the arm clamping means and the arm translating means whereby the translating means automatically will be rendered ineffective whenever the arm clamping means is rendered effective, thereby preventing the simultaneous employment of opposing forces.

Still further objects are to provide simplified valve means for controlling the clamping of the sleeve on the column, the clamping of the arm on the sleeve and the translation of the arm; to provide relatively small hydraulic motors controlled by said valve means for actuating said arm and column clamps; to embody said valve means and hydraulic motors in a single unit adapted to be fitted into a suitable cavity formed in the arm casting and to provide means, carried adjacent the drill head and accessible to the operator when in his normal working position, for actuating said valve means.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 8:
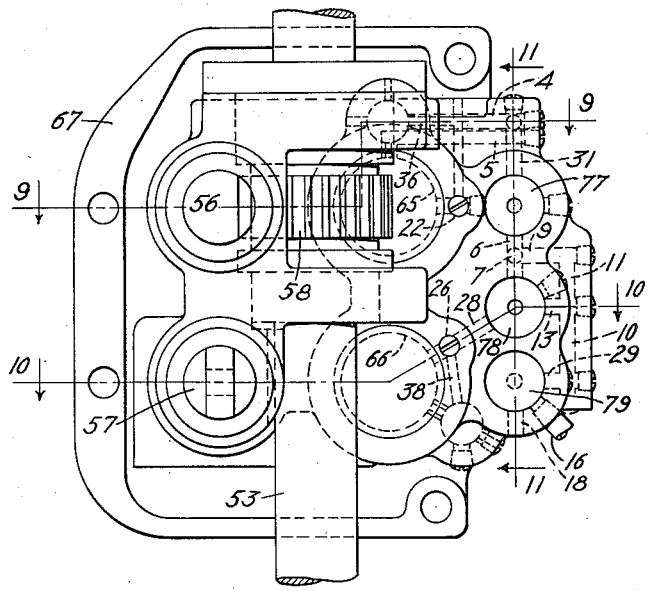
Figure 12:
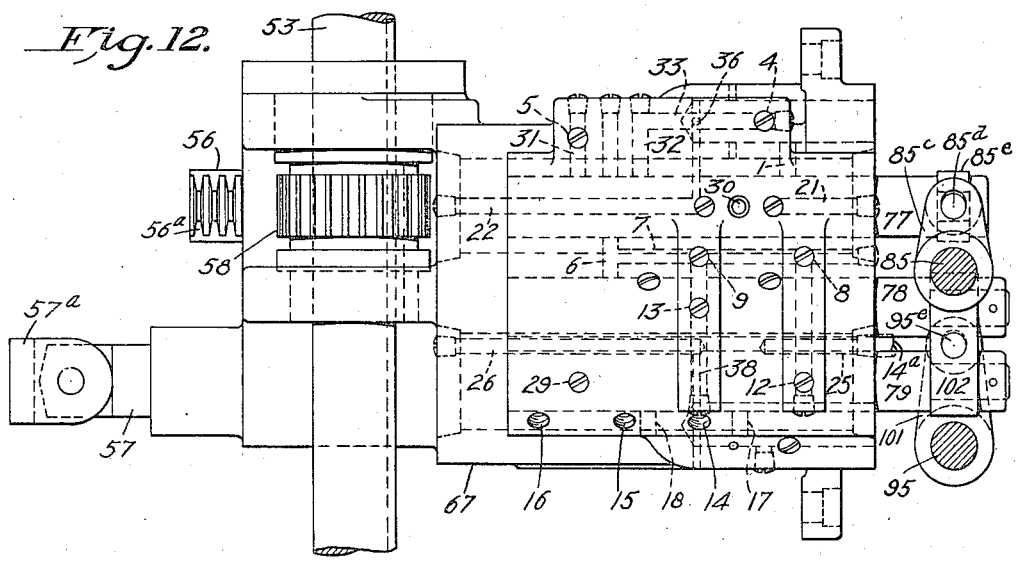
Figure 9:
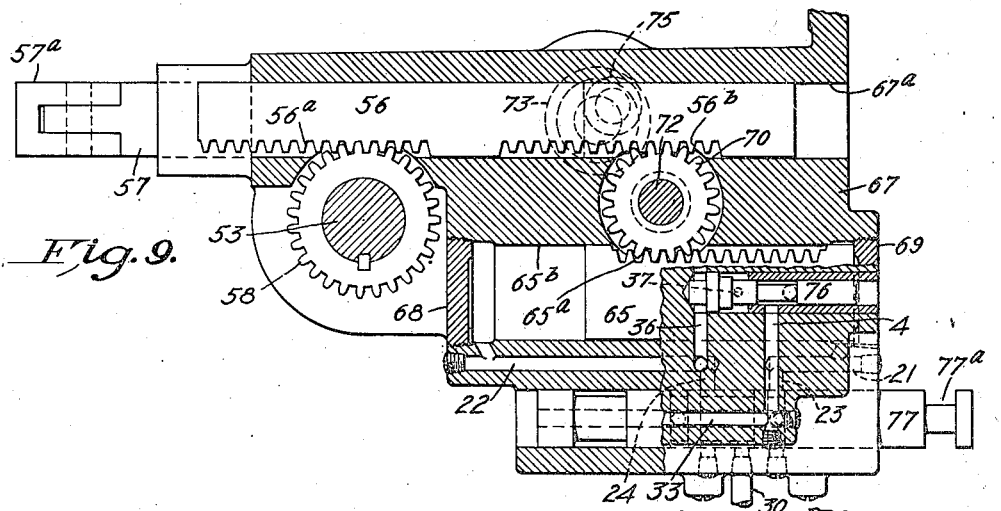
Figure 10:
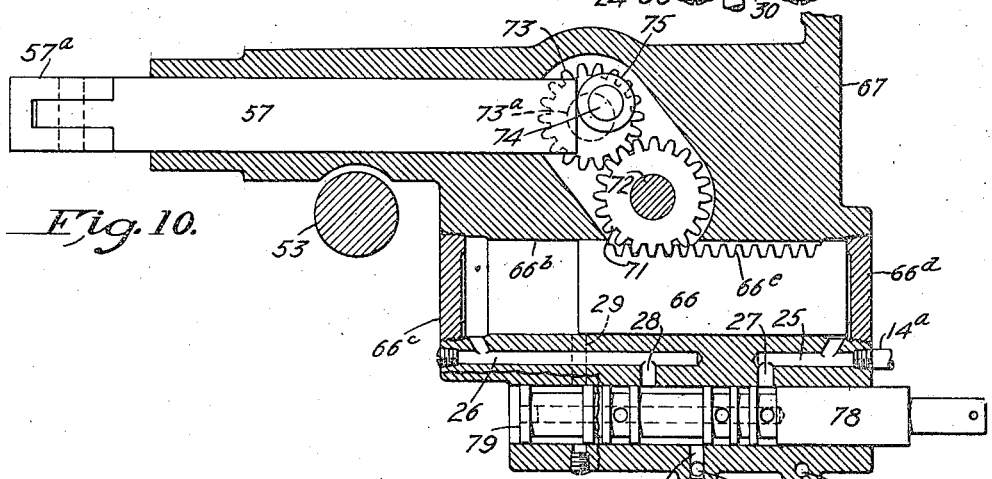
Figure 11:
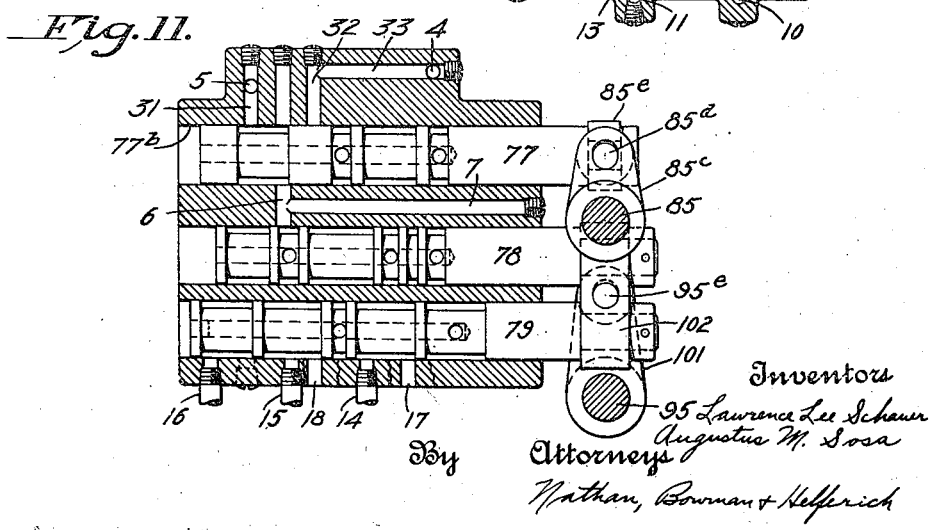
Figure 14:
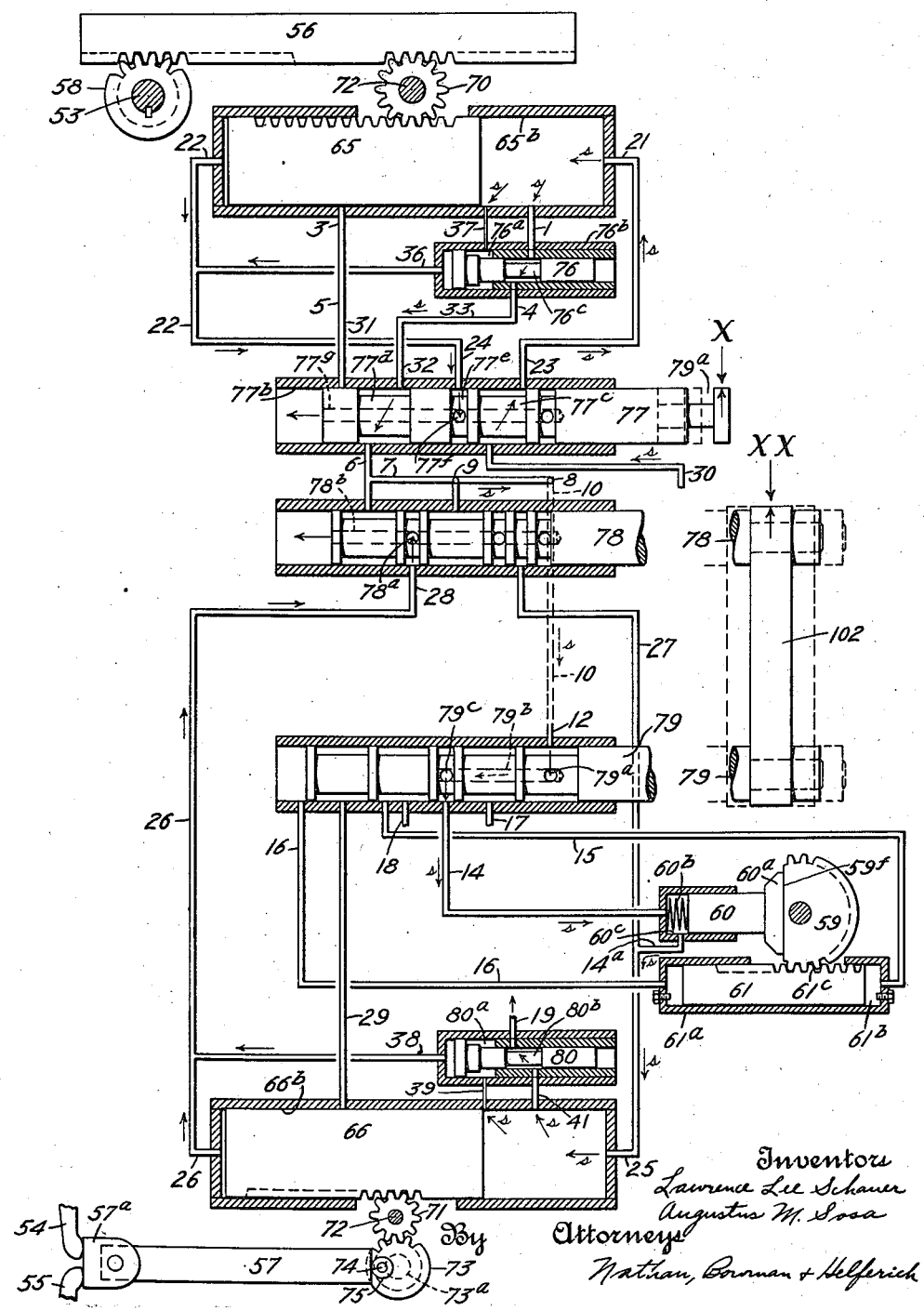
Figure 15:
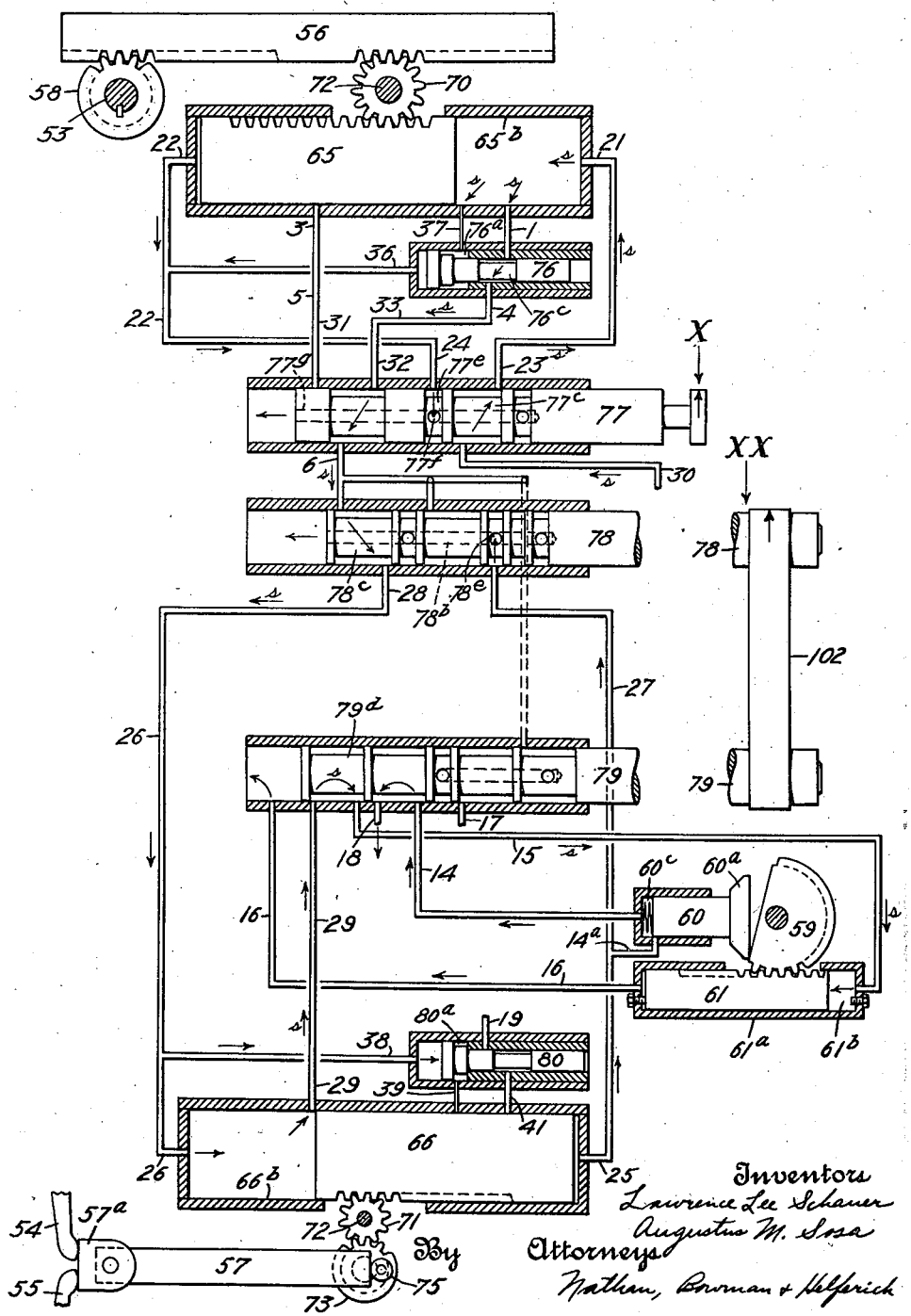
Figure 16:
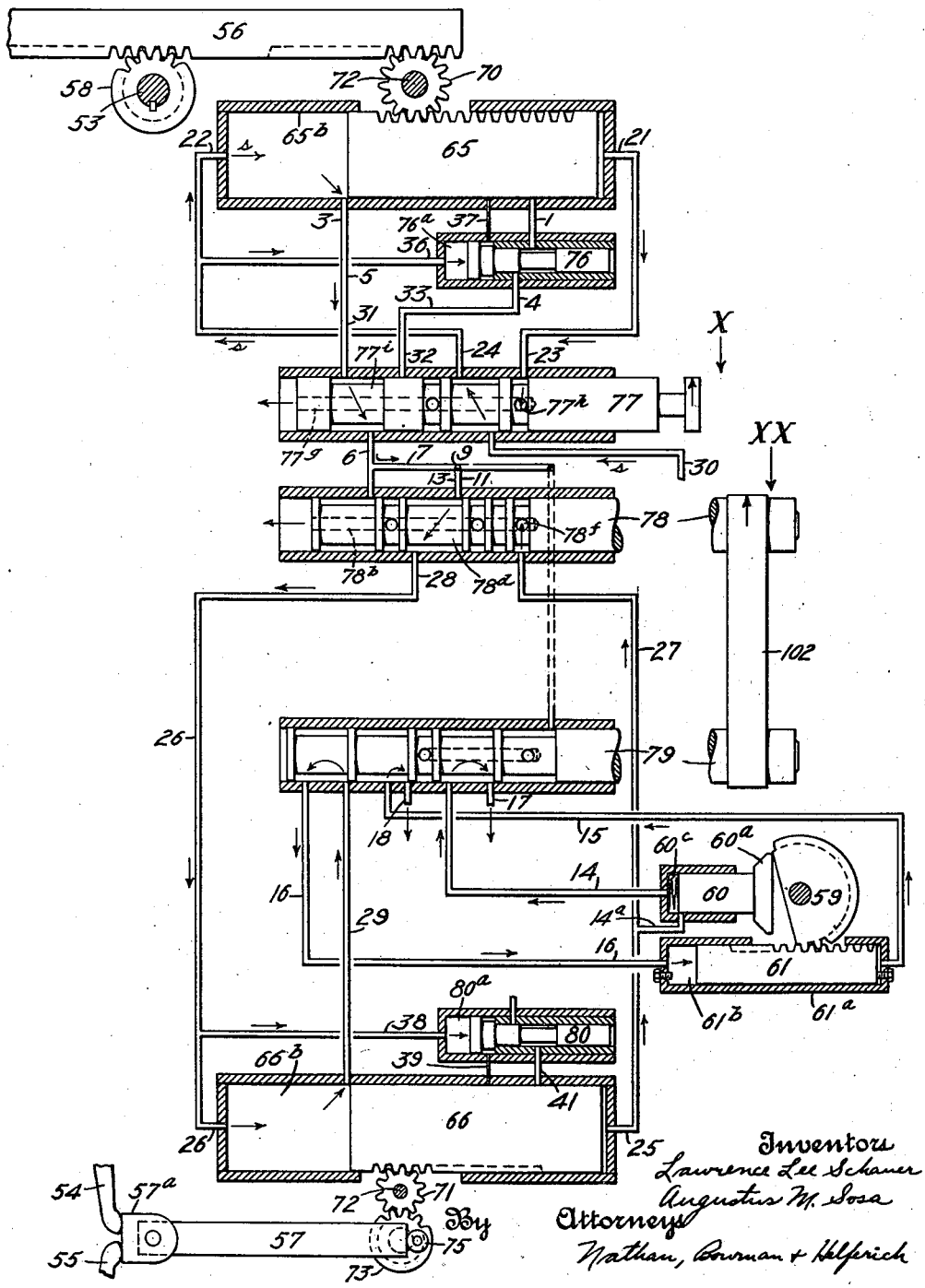

Figure 1 is a front elevation of a radial drill embodying the present invention. Fig. 2 is an enlarged left end view of the lower portion of Fig. 1 with the rearwardly projecting portion of the arm in section, better to show the hydraulic unit embodied therein and the connection from said unit to the arm clamping means. Fig. 3 is a rear view of a portion of the column and a portion of the arm supported thereon, showing particularly the connection between the arm shaft and its driving motor and portions of the hydraulic system for actuating the arm and column clamps. Fig. 4 is a plan view of a portion of the arm, the pump and other elements of the hydraulic system. Fig. 5 is a vertical sectional view through the radial arm, looking toward the column, portions of the arm adjacent the column being broken away to disclose the driving connection between the arm shaft and the arm translating screw and nut. Fig. 6 is a detail view, partly broken away, showing the connections between the clamp actuating and arm translating control levers on the drill head and certain valve actuating rock shafts journaled in the arm adjacent the column. Fig. 7 is a plan view of a portion of Fig. 6. Fig. 8 is a detail view of the inner end of the hydraulic unit which controls and actuates the arm and column clamps. Fig. 9 is a horizontal section substantially on the line 9—9 of Fig. 8. Fig. 10 is a similar section substantially on the line 10—10 of Fig. 8. Fig. 11 is a vertical section substantially on the line 11—11 of Fig. 8. Fig. 12 is a right side elevation of the unit shown in Fig. 8. Fig. 13 is a sectional development of two of the control valves, their casing, and the arm clamping motor controlled thereby. Figs. 14, 15 and 16 are diagrammatic views illustrating various positions of the valves and the parts controlled thereby. Of these, Fig. 14 shows the valves in the positions to effect clamping of both the arm and the column, the clutch which controls the vertical translation of the arm at this time being held in its neutral position. Fig. 15 shows the valves in the positions necessary to maintain the column clamped, to unclamp the arm, and to effect upward movement of the latter. Fig.

16 shows the valves in the positions to unclamp the column, to unclamp the arm, and to effect downward movement of the arm. It is to be understood that the instant the operator releases the lever which controls the positions of the valves which actuate the arm translating and arm clamping means those valves will be moved automatically to the positions shown in Fig. 14 thereby disconnecting the arm translating means from its drive shaft and clamping the arm.

Referring more specifically to the drawings the invention is disclosed as embodied in a radial drill comprising a base B, an upright column consisting of a post O fixed to the bed and a cylindrical sleeve S rotatably journaled thereon. Upon the sleeve is slidingly fitted, for vertical movement, the girdle G of a radial arm A which extends from opposite sides of the girdle and supports on its rearward extension $a^1$ a driving motor M while its opposite extension $a^2$ supports a translatably mounted tool head A. A shaft C journaled lengthwise of the arm, and rearwardly thereof, serves to transmit motion from the drive shaft $m$ of the motor to the tool head for rotating the tool spindle T journaled therein.

The connection from the motor shaft $m$ to the arm shaft C comprises a gear $m'$ secured upon the motor shaft and a gear $c'$ meshing therewith and fixed upon the arm shaft, as shown most clearly in Figs. 2 and 3. To effect vertical adjustment of the arm on the sleeve there is provided a stationary screw E extending lengthwise of the sleeve, which screw is engaged by a power driven nut N rotatably journaled in the arm. A normally strain-free safety nut N' is threaded on the screw E and dogged normally to turn with the main nut N. This safety nut being strain-free is not subject to wear and is available to support the arm should the main nut fail due to stripping of the threads.

The nut N is rotated from the arm shaft C through gearing designated generally as $x$ (see Figs. 3 and 5) and the direction of rotation is determined by clutch U and D selectively operated by a cone collar F slidably mounted on the shaft C. Actuation of clutch U causes the nut to be rotated in a direction to move the arm up, whereas the clutch D causes it to be rotated in the opposite direction to move the arm down. The collar F is adapted to be shifted, selectively to render the clutches U and D effective, by a shifter arm $59^a$ secured upon one end of a short shaft $59^b$ journaled vertically in bearings provided in a housing I secured upon the rear side of the arm. Upon the other end of the shaft $59^b$ there is secured a gear segment 59, the teeth of which are engaged by rack teeth formed on a hydraulic piston 61, later to be referred to. Thus reciprocation of the piston in one direction causes the clutch U to be engaged and reciprocation in the other direction engages the clutch D.

To maintain the arm in any desired position of vertical adjustment, suitable means is provided for clamping the arm to the sleeve. As shown most clearly in Fig. 2, the girdle G of the arm is split, as at $g$, and means is provided for contracting the girdle into clamping contact with the sleeve S extending therethrough. The clamping means comprises clamp levers 54 and 55 fulcrumed, respectively, on pins $g^1$ and $g^2$ fitted into ears $g^3$ and $g^4$ at one side of the split $g$. Intermediate their ends the levers are connected with draw bolts $g^5$ and $g^6$ which pass through the ears $g^3$ and $g^4$ and through similar ears $g^7$ and $g^8$ at the opposite side of the split and have nuts $g^9$ and $g^{10}$ threaded thereon. Thus outward movement of the inner ends of the levers will cause the split girdle to be contracted into clamping contact with the sleeve. The fluid pressure actuated means for actuating the clamp levers will be described later.

Means also is provided for clamping the sleeve to the post in all of its angular positions of adjustment thereon. This means also is shown most clearly in Fig. 2. The lower enlarged portion of the sleeve is split as indicated at $h$ thus providing flexible portions $h^1$ and $h^2$. These portions are adapted to be constricted to cause them to grip the post therein. This may be effected either by power or manually as now will be explained. Journaled lengthwise of the sleeve is a rotary shaft 53 having an eccentric portion $53^a$ embraced by a strap $53^b$ to which is connected one end of a rod $53^c$ passing loosely through ears $h^3$ and $h^4$ on the sleeve S. The opposite end of the rod has fixed to it a sleeve upon which is threaded the hub $53^d$ of a hand lever $53^e$. Thus rotation of the hand lever in one direction causes the portions $h^1$ and $h^2$ to be constricted thereby to clamp the sleeve to the post. Stop screws $s^1$ and $s^2$ serve to limit the expansion of the split portion of the sleeve.

Fluid pressure actuated means, hereinafter to be described, is provided for rotating the shaft 53 and eccentric $53^a$, whereby the rod $53^c$ is caused to act as a draw bolt to contract the sleeve.

Fluid pressure, to actuate the arm clamp, the column clamp and the arm translating reversing clutches, is provided by a pump P mounted in the housing I and driven from the motor M by having its gear $p^1$ in engagement with the gear $c^1$ on the arm shaft C. The pump draws oil from a reservoir R formed in the arm casting through an intake conduit $i$ and discharges it through a pipe 30 to certain valve means, later to be described, and eventually to the clamping motors and the actuating means for the arm translating reversing clutch. The maximum pressure in the line 30 is determined by the setting of a relief valve $v$ connected with the line 30 and having a discharge line $v^2$ extending back to the reservoir.

Referring now to Figs. 2 and 9, it will be seen that the column clamping shaft 53 has splined to it a gear 58 engaged by the teeth $56^a$ of a slide-bar 56, slidably mounted in a bore $67^a$, formed in a sub-frame or unit 67. This unit is supported by the arm and extends into a cavity $67^f$ formed in the arm. The unit 67 also carries the control valves and hydraulic motors, later to be referred to. Also formed on the slide-bar 56 is a second set of rack-teeth $56^b$ engaged by a pinion 70 journaled on a stud 72 carried by the sub-frame 67. The pinion is engaged at its opposite side by teeth $65^a$ formed on a piston 65 reciprocably mounted in a bore $65^b$ formed in the sub-frame 67. The opposite ends of the bore $65^b$ are closed by plugs 68 and 69. The cylinder $65^b$ and the piston 65 constitute, what may be termed, a first hydraulic motor. From the foregoing it will be understood that by admitting fluid under pressure alternately into the opposite ends of the cylinder $65^b$ the piston 65 may be shifted axially therein which, through the connections above described, will effect rotation of the shaft 53 and thereby alternate clamping and unclamping of the column.

Within the sub-frame 67 beneath the bore $65^b$ there is arranged a second hydraulic motor comprising a similar bore $66^b$ closed at its ends by plugs $66^c$ and $66^d$ (see Fig. 10). Within this bore is slidingly fitted an arm clamp closing piston 66 having rack-teeth 66ᵉ engaging a pinion 71 also rotatably journaled on the stud 72. This gear meshes with and drives a gear 73 journaled in a stud 73ᵃ supported by the sub-frame 67. Gear 73 is fitted with an eccentric stud 74 surrounded by a roller 75 which latter bears against one end of a clamp actuating slide-rod 57, the other end of which carries an equalizing head 57ᵃ engaging the free ends of the arm clamp levers 54 and 55. Thus alternate reciprocations of the piston 66 in its cylinder 66ᵇ will effect clamping and unclamping of the arm.

Fixed to the rear side of the arm A upon a ledge a³, is a unit 61ᵃ affording a third hydraulic motor comprising a piston 61 reciprocably mounted in a cylinder 61ᵇ, formed as a bore in said unit. The piston 61 is formed in its side with a series of rack-teeth 61ᶜ which mesh with the teeth of the clutch-actuating gear segment 59 above referred to. By admitting fluid pressure alternately into opposite ends of the cylinder 61ᵇ the piston may be reciprocated alternately to engage the arm-translating clutches U and D to effect elevation or depression of the arm.

As shown in Fig. 4 and more clearly in Figs. 14, 15 and 16 the gear segment 59 is formed with a flat side 59ᶠ against which bears the head 60ᵃ of a plunger 60. This plunger is adapted to be pressed toward the segment constantly by a spring 60ᵇ and at certain times also by fluid pressure admitted into the cylinder 60ᶜ within which the plunger is slidingly fitted. The pressure of the plunger on the segment 59 tends to return it to its intermediate position which corresponds to the neutral position of the clutch-actuating cone collar F. The gear segment 59 and collar F may, however, be moved out of their intermediate or neutral positions by the action of the fluid pressure actuated piston 61.

Valve means, embodied in the unit 67, are provided for controlling the actuation of the column and arm clamping hydraulic motors 65—65ᵇ and 66—66ᵇ, respectively, and also the hydraulic motor 61—61ᵇ which controls the arm translating mechanism as well as the plunger 60. These valve means comprise a piston valve 77 slidably mounted in a bore 77ᵇ in said hydraulic unit for controlling the column clamping motor and a pair of parallel piston valves 78 and 79 connected together and adapted to be moved simultaneously to control the arm clamping motor and the plunger 60.

As hereinbefore stated, an object of this invention is to provide means convenient to the operator when in his normal working position to actuate said valve means. This has been attained by the provision of two levers carried by the tool head and operative connections between said levers and said valves. As shown in the drawings, and more particularly in Figs. 1, 5, 6 and 7, two rods 83 and 93 are journaled lengthwise of the arm in brackets b¹ and b² carried by the arm. Journaled in a bracket b³ carried by the tool head and adapted to be translated therewith are a column clamping lever 51 and a lever 52 adapted to control the arm clamp and also the arm translating clutches U and D. These levers have splined connections with the rods 83 and 93, respectively, and are adapted to actuate them in all positions of the head on the arm. To the left end of the rod 83 there is secured a crank arm 83ᵃ connected by link 84 with a similar crank arm 85ᵃ fixed upon one end of a shaft 85 journaled in brackets 86ᵃ and 86ᵇ secured upon the rear side of the arm. The opposite end of the shaft 85 has fixed to it an arm 85ᶜ connected by a pin 85ᵈ with a block 85ᵉ fitted within the reduced portion 77ᵃ of the piston valve 77.

The left end of rod 93 has fixed to it a crank arm 93ᵃ connected by a link 94 with a similar crank arm 95ᵃ secured upon one end of a shaft 95 journaled at one end in the bracket 86ᵃ and at the other end in a bracket 86ᶜ secured to the arm. To the other end of the shaft 95 there is secured a crank arm 101 connected by a pin 95ᵉ with a cross head 102 connected with the piston valves 78 and 79.

From the foregoing it will be understood that by selective manipulation of the levers 51 and 52 the column may be clamped or unclamped and the arm may be clamped or unclamped and caused to be moved either upwardly or downwardly. As hereinafter will be more clearly explained the arm clamp is automatically released when the lever 52 is shifted to effect either upward or downward movement of the arm and the arm translating means is automatically rendered ineffective and the arm clamp is automatically closed when the operator ceases manually to maintain the arm translating means effective. Upward movement of the lever 52, from its intermediate position, causes the arm to be unclamped and moved upwardly while downward movement of the lever causes the arm to be unclamped and moved downwardly. Means now to be described, is provided for automatically returning the lever 52 to its intermediate position when it is released by the operator. Projecting rearwardly from the shaft 95 is an arm 96ᵃ connected with a rod 96 slidingly mounted in the bracket 86ᵃ. Within a chamber 86ᶠ formed in the bracket 86ᵃ and about the rod 96 is a coil spring 99 which engages, at its opposite ends, washers 98 and 98ᵃ loosely surrounding the rod 96 and adapted to bear against the inner end walls of the chamber 86ᶠ. Collars 97 and 97ᵃ pinned to the rod 96 are adapted upon opposite movements of the rod, by actuation of the lever 52, to engage the washers 98 and 98ᵃ and compress the spring 99. When the lever 52 is released the spring 99 acts to bring the parts including the lever 52 to their intermediate positions which, by manipulation of the valves 78 and 79, causes the arm to be clamped.

The lever 51 is adapted to be moved to either of two positions i. e. to an upper position by which, through the connections above described, it causes the valve 77 to be moved to the right, to the position shown in Fig. 16 in which it effects unclamping of the column, or to a lower position by which it shifts the valve 77 to the left to the position shown in Figs. 14 and 15 in which it effects clamping of the column. To yieldingly maintain the lever in either of its two positions, the shaft 85 has fixed to it a cam collar 86 having facets 86ˣ and 86ʸ adapted to be engaged by a plunger 87 slidingly mounted in a bore in the bracket 86ᵃ and urged toward the collar 86 by a spring 88.

To conduct the fluid pressure from the discharge conduit 30 of the pump through the various valves and to the various hydraulic motors to effect actuation of the devices in the desired order, the hydraulic unit or sub-frame 67 is formed with a series of ducts or conduits provided by holes drilled therein. The hydraulic motor 61—61ᵇ, which actuates the clutch shifter, and the hydraulic cylinder 60ᶜ and plunger 60 which tend to return the clutch shifter to its neutral position are connected with the valve means and the arm clamping motor by external piping as later will be described. The valve pistons 77 and 78 are formed with central bores through which, at certain times, exhaust fluid is discharged back into the reservoir.

Figs. 4, 8, 9, 10, 11, 12 and 13 show the various parts and conduits but the operation of the system can more readily be understood from the diagrammatic Figs. 14, 15 and 16 to which attention is now directed. In those Figs. X and XX indicate datum lines which coincide with arrows on the valves 77 and the cross head 102, respectively, when the valves 77, 78 and 79 are in their position in which they effect clamping of the column and arm. Referring first to Fig. 14 in which the valves are shown in the positions in which they have effected clamping of both the column and arm, the flow of pressure fluid from the pump discharge conduit 30 is indicated by the arrows s. Fluid from the pressure conduit 30 enters the casing of the valve 77, passes about the reduced cylindrical portion 77c of the valve 77 and thence through conduits 23 and 21 into the right end of the cylinder 65b forcing the piston 65 to the left and thereby effecting clamping of the column. After the piston 65 has been given its full movement fluid under pressure in the right end of cylinder 65b flows through port 37 connecting with a cylinder 76a in which is slidingly fitted a piston valve 76. Pressure in the cylinder 76a causes the valve 76 to be moved to the left to the position shown in Fig. 14 thereby permitting fluid in the intake end of the cylinder 65b to flow from the cylinder through a conduit 1, into the casing 76b for the valve 76, around the reduced portion 76c of the valve and through conduits 4, 33 and 32 into the casing of the valve 77 adjacent the reduced portion 77d thereof. From there it flows through conduits 6, 7, 8, 10 and 12 into the casing of valve 79, through a radial port 79a in the valve 79 through an axial bore 79b therein, out through radial bore 79c and through external pipe 14 into the cylinder 60c behind the plunger 60 which serves by the action of the head 60a on the segment 59 to shift the arm-translating clutches U and D to neutral. Flow continues thence through external conduit 14a and bore 25 into the right end of cylinder 66b, forcing the piston 66 to the left and thereby setting the arm clamp. When the piston 66 has been moved to the left sufficiently to clamp the arm fluid flows from the cylinder 66b through port 39 into cylinder 80a containing piston valve 80. This causes the valve to be moved to the left and fluid entering the cylinder 66b flows through conduit 41, about the reduced portion 80b of the valve 80 and thence through conduit 19 back to the reservoir. From the foregoing it will be seen that after the arm and column clamps have been set the pump discharges back to the reservoir through a pressure free line.

As the piston 65 is moved to the left the fluid in the left end of the cylinder 65b is discharged through conduits 22 and 24 into the casing of the valve 77 adjacent the reduced portion 77e thereof. From there it flows through radial port 77f into an open ended axial bore 77g in the valve 77, from which it is discharged back into the reservoir R. Likewise, fluid in the left end of the chamber 76b is discharged through conduit 36 into conduit 22 and from there back to the reservoir as above described. Fluid from the left end of cylinder 66b is discharged through conduits 26 and 28 into the casing for the valve 78, from which it flows through radial port 78a in the valve 78 to a central bore 78b which extends to one end of the valve and discharges into the reservoir. The left end of cylinder 80a discharges through a conduit 28 into conduit 26 and thence back to the reservoir.

Fig. 15 shows the valve 77 in the position to maintain the column clamped and the valves 78 and 79 shifted to the position which effect unclamping of the arm and shifting the arm-translating control clutch lever to the position in which it effects upward movement of the arm. This positioning of the valves 78 and 79 is effected by upward movement of the lever 52 on the tool head. It will be noted that the flow of fluid indicated by the arrows s, from the pressure line 30 through the valve 77 into the cylinder 65b and thence outwardly therefrom through conduits 1, 4, 33 and 32 into the casing for valve 77 as well as the discharge from the left end of the cylinder 65b remains as above described. From the valve 77 pressure fluid flows through conduit 6 into the casing for valve 78 about the reduced portion 78c of that valve and thence outwardly through conduits 28 and 26 into the left end of cylinder 66b of the arm clamp actuating motor thereby forcing the piston 66 to the right and effecting unclamping of the arm. Pressure fluid also flows from the conduit 26 through conduit 38 into the left end of cylinder 80a thereby pushing the piston valve 80 to the right and closing off discharge port 19. Fluid discharged from the right end of cylinder 66b flows through conduits 25, 14a and 27 into the casing of valve 78, through radial port 78e of said valve and into the open ended axial bore 78b from which it is discharged back into the reservoir R.

When the actuating fluid, entering the left end of cylinder 66b, has shifted the piston to the right sufficiently to release the arm clamp, the piston uncovers a port connected, by conduit 29, with the casing of valve 79 adjacent the reduced portion 79d of the valve. From the valve casing the actuating fluid flows through conduit 15 into the right end of the cylinder 61b of the clutch actuating motor. Pressure in that end of the cylinder shifts the piston 61 to the left thereby rotating the gear segment 59 clockwise and effecting, through the mechanical connections hereinbefore described, engagement of the arm elevating clutch U whereby the arm is moved upwardly by power from the shaft C. This clockwise rotation of gear segment 59 moves plunger 60 to the left sending fluid from the left end of cylinder 60c through conduit 14 into the casing of valve 79 from which it flows outwardly through conduit 18 to the reservoir. Fluid is discharged from the left end of cylinder 61b through conduits 16 to the reservoir. It is to be understood that the valves 78 and 79 will remain in the position shown in Fig. 15 only so long as the operator holds the lever 52 in its uppermost position. The instant he ceases to hold the lever in that position the spring 99 will return the lever to its intermediate position and the valves 78 and 79 to the position shown in Fig. 14 thereby discontinuing translation of the arm and setting the arm clamp.

Fig. 16 shows the positions of the valves and the parts controlled thereby when the column clamping lever 51 is moved to its upward position and the arm clamping lever 52 is moved downward from its intermediate position. In this position of the valves, actuating fluid is conducted as indicated by the arrows s, from the pressure line 30 into the left end of cylinder 65b through conduits 24 and 22 thereby shifting the piston 65 to the right and effecting unclamping of the column. Fluid under pressure is admitted from conduit 22 through conduit 36 into the left end of cylinder 76ª thereby shifting the valve 76 to the right and cutting off exhaust port 4. Fluid is discharged from the right end of cylinder 65ᵇ through conduits 21 and 23 into the casing for valve 77 from whence it flows inwardly through radial port 77ʰ in the valve 77 to the central bore 77ᵉ and thence into the reservoir.

When the piston 65 has moved to the right sufficiently to unclamp the column, it uncovers a port which connects, by conduits 3, 5 and 31, with the casing of valve 77. This fluid passes about the reduced portion 77ⁱ of the valve and out through conduits 6, 7, 9, 11 and 13 into the casing of valve 78, thence around the reduced portion 78ᵈ of the valve and through conduits 28 and 26 into the left end of cylinder 66ᵇ, causing the piston 66 to be moved to the right and thereby the arm clamp to be released. Simultaneously with the flow of fluid into the left end of the cylinder 66ᵇ fluid flows from the conduit 26 through conduit 38 into the left end of cylinder 80ª thus causing the piston valve 80 to be shifted to the right thereby closing exhaust conduit 19. Fluid from the right end of cylinder 66ᵇ is then discharged through conduits 25, 14ª and 27 into the casing of valve 78, through radial port 78ᶠ of said valve and into the open ended axial bore 78ᵇ, from which it is discharged back into the reservoir R.

When the piston 66 has been shifted to the right sufficiently to release the arm clamp the piston uncovers a port connected by conduit 29 with the casing of valve 79 and the pressure fluid flows therethrough. From that casing the fluid flows through conduit 16 to the left end of cylinder 61ᵇ of the clutch actuating motor. Fluid pressure in the left end of the motor causes the piston 61 to be shifted to the right, rotating the segment 59 counter-clockwise and thereby rendering effective the clutch D which causes the arm to be moved downwardly. Fluid from the right end of cylinder 61ᵇ is discharged to the reservoir through conduit 15 casing of valve 79 and conduit 18. Upon release of the lever 52 it automatically will be moved to its intermediate position and the valves 78 and 79 and the clutch controlling motor and the arm clamp motor will be brought to the positions shown in Fig. 14.

From the foregoing it will be understood that the arm and column clamps, although connected hydraulically, are independently actuable. It is to be noted that the fluid which shifts the arm-translating control clutches U and D must first pass through the arm clamp actuating motor and the piston of that motor must be shifted to a position which effects unclamping of the arm before either of the clutches U or D may be rendered effective to translate the arm.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:—

1. In a machine tool two successively operable clamping mechanisms; an hydraulic motor for actuating each of said clamping mechanisms; a source of fluid pressure; conduits for connecting said source with said hydraulic motors; and valve means controlling the flow of fluid through said conduits, said valve means including a main control valve and a supplemental valve operated by fluid pressure permitted to escape through a port uncovered by one of said motors when same has been actuated to an extreme position for directing said flow of fluid to the other of said clamp motors.

2. In a drilling machine a post; a sleeve thereon; means to clamp said sleeve to said post; an arm on said sleeve; means to clamp the arm to the sleeve; an hydraulic motor operatively connected to actuate each of said clamping means; a fluid pressure line; conduits connecting said pressure line with said hydraulic motors; and valve means controlling the flow of fluid through said conduits, said valve means including a first valve and a second valve operated by fluid permitted to escape through a port uncovered by said sleeve clamping motor when same is in one of the extreme positions for directing said flow of fluid to said arm clamping motor.

3. In a drilling machine a post; a sleeve thereon; means to clamp the sleeve to the post; an arm on said sleeve; means to clamp the arm to the sleeve; an hydraulic motor operatively connected to actuate each of said clamping means; a source of fluid pressure; conduits connecting said source with said sleeve clamping motor; a reversing valve embodied in said conduits for actuating said sleeve clamping motor first to clamp the sleeve and then to unclamp it; and conduits connecting the pressure end of said sleeve clamping motor with said arm clamp actuating motor, the last named conduits being rendered effective to connect said arm clamp actuating motor with the said source only when the sleeve clamp motor is in its fully clamped or unclamped position.

4. A drilling machine combining a column; an arm translatably mounted on said column; means for translating the arm on the column; means to clamp the arm to the column in its adjusted positions; clutch mechanism for controlling the arm translating means and for determining the direction of translation of the arm; hydraulic means for actuating said clutch mechanism to a neutral position; an hydraulic motor connected to actuate said arm clamp; and hydraulic means coordinating said hydraulic means for actuating said clutch mechanism to a neutral position with said arm clamping motor for automatically rendering said arm translating means ineffective prior to the actuation of the arm clamp motor to its clamped position.

5. In a radial drill a post; a sleeve thereon; means to clamp said sleeve to said post; an arm on said sleeve; a tool head on said arm; means to clamp the arm to the sleeve; an hydraulic motor operatively connected to actuate each of said clamping means; a fluid pressure line; conduits connecting said pressure line with said hydraulic motors; a plurality of valves directing the flow of fluid through said conduits, first to said sleeve clamping motor and then to said arm clamping motor; actuating levers carried by said tool head, operatively connected with said valves and independently operative selectively to actuate said sleeve and arm clamps.

6. In a drilling machine a post; a sleeve thereon; means to clamp the sleeve to the post; an arm on said sleeve; means to clamp the arm to the sleeve; an hydraulic motor operatively connected to actuate each of said clamping means; a fluid pressure line; conduits connecting said line with said sleeve clamping motor; a reversing valve embodied in said conduits for actuating said sleeve clamping motor first to clamp the sleeve and then to unclamp it; conduits connecting the intake conduit of said sleeve clamping motor with said arm clamp actuating motor, and valve means in the last named conduits and adapted to effect either clamping or unclamping of the arm in either the clamping or unclamping position of the sleeve clamp actuating motor.

7. A drilling machine combining a column; an arm translatably mounted on said column; means including a screw extending lengthwise of the column and a cooperating nut carried by the arm for translating the arm on the column; means to clamp the arm to the column in its adjusted positions; a first clutch for effecting upward movement of the arm; a second clutch for effecting downward movement of the arm; hydraulic means for selectively actuating said clutches; an hydraulic motor connected to actuate said arm clamp; and hydraulic means coordinating said clutch actuating means with said arm clamping means for automatically releasing said arm clamp before either of said clutches is rendered effective.

8. A drilling machine combining a column; an arm translatably mounted on said column; means including clutch mechanism for translating the arm on the column; means to clamp the arm to the column in its adjusted positions; means for actuating said clutch mechanism; an hydraulic motor connected to actuate said arm clamp; a manually actuable element for controlling both said clutch actuating means and said hydraulic motor; and hydraulic means controlled by said arm clamping motor for insuring the release of said arm clamp before said arm translating means is rendered effective.

9. A drilling machine combining a column; an arm translatably mounted on said column; means for translating the arm on the column; means to clamp the arm to the column in its adjusted positions; an hydraulic motor for rendering effective said arm translating means; an hydraulic motor connected to actuate said arm clamp; an hydraulic system connected serially with said clamp actuating motor and with the actuating motor for said arm translating means whereby the arm clamp must be released before the arm translating means may be rendered effective; and a manual control for said hydraulic system.

10. A drilling machine combining a column; an arm translatably mounted on said column; means for translating the arm on the column; means to clamp the arm to the column in its adjusted positions; clutch mechanism for controlling the arm translating means and for determining the direction of translation of the arm; hydraulic means for actuating said clutch mechanism; an hydraulic motor connected to actuate said arm clamp; and fluid pressure actuated means coordinated with said arm clamping means for automatically rendering said clutch mechanism ineffective when fluid pressure is directed to said arm clamp motor to close said arm clamp.

11. In a machine tool two clamping mechanisms, first and second hydraulic motors for actuating said clamping mechanisms; a fluid pressure line; conduits for connecting said line serially with said hydraulic motors; valve means controlling the flow of fluid through said conduits said valve means acting to direct said fluid first to said first hydraulic motor; a by-pass valve embodied in said conduit connecting said motors; and means actuated by pressure in said first hydraulic motor after a complete actuation thereof for opening said by-pass valve, thereby to permit a flow of fluid through the first motor to the second motor.

12. In a machine tool two clamping mechanisms; first and second hydraulic motors each connected with one of said clamping mechanisms and each adapted to receive fluid pressure in one end for closing its associated clamp and in the other end for opening its clamp; a fluid pressure line; a conduit connecting said line with said first motor; a conduit connecting the clamp closing end of said first motor with the clamp closing end of said second motor; a by-pass valve embodied in the last named conduit adapted to be opened by pressure in said first motor; and a by-pass valve connected with the clamp closing end of said second motor and adapted to be opened by pressure therein after the clamp has been closed, thereby to provide a pressure free discharge from said pressure line after both clamps have been closed.

13. A drilling machine combining a column; an arm translatably mounted thereon; hydraulically actuated means including an hydraulic motor to clamp said arm to said column; means including a fixed screw and a nut rotatably journaled in said arm to translate said arm on said column; means including a power shaft and forward and reverse drive clutches for effecting rotation of said nut and thereby translation of said arm in opposite directions; a clutch shifter; an hydraulic motor and mechanical connections for actuating said shifter selectively to render effective said clutches, said clutch shifting motor being connected in series with said arm clamping motor and receiving actuating fluid therefrom to render either of said clutches effective only after complete release of said arm clamp; and manually actuated means for controlling said hydraulic motors.

14. A drilling machine combining a column; an arm translatably mounted thereon; hydraulically actuated means including an hydraulic motor for clamping said arm to said column; mechanical means to translate said arm on said column; a plurality of clutches for determining the direction of translation of said arm; clutch controlling means selectively to render said clutches effective; an hydraulic motor operatively connected to actuate said clutch controlling means; a fluid pressure system serially connecting said motors and including a fluid pressure line, conduits and controlling valves for first effecting release of said arm clamp and subsequently effecting operation of said clutch actuating motor to cause it selectively to actuate said clutches; and a manually operable means for actuating said controlling valves.

15. A radial drill combining a post; a sleeve rotatably journaled thereon; an arm translatably mounted on said sleeve and formed with a reservoir and a cavity; means including a rotary actuating shaft to clamp the sleeve to the post; means including a reciprocating clamp actuating rod to clamp the arm to the sleeve; a sub-frame secured to said arm and projecting into the cavity therein; a first hydraulic motor embodied in said sub-frame and operatively connected with said clamp actuating shaft; a second hydraulic motor embodied in said sub-frame and operatively connected with said reciprocating clamp actuating rod; a pump and conduits adapted to draw fluid from said reservoir and deliver it to said sub-frame under pressure; and manually controlled valves embodied in said sub-frame for selectively transmitting said fluid to said motors to cause them to open or close said clamps.

16. A drilling machine combining a column; an arm translatably mounted thereon; mechanical means to translate said arm on said column including a first clutch for effecting upward translation of said arm; and a second clutch for effecting downward translation of said arm; clutch controlling means including an oscillatory shaft and a clutch shifter carried thereby and adapted, by oscillation of said shaft, selectively to render said clutches effective; an hydraulic motor operatively connected to oscillate said shaft thereby to render either of said clutches effective; a second hydraulic motor adapted to render both of said clutches ineffective; a manually actuable element controlling the action of said motors and having three positions of adjustment, one effecting upward movement of said arm, a second effecting downward movement of the arm and a third which renders the arm translating means ineffective; and means automatically to bring said element to its third position when released by the operator.

17. A drilling machine combining a column; an arm translatably mounted on the column; a tool head on the arm; power actuated means for translating said arm on the column; an hydraulic motor for controlling said power actuated means; power actuated means including an hydraulic motor for clamping the arm to the column; a single manually actuable element carried by the tool head for controlling both of said hydraulic motors and for effecting successive actuation thereof by a single movement of said element; and means, effective upon release of said element by the operator, automatically to return said element to a position to discontinue translation of the arm and to clamp the arm to the column.

18. A drilling machine as set forth in the preceding claim in which the single manually actuable control element is so connected with the power actuated translating means and the power actuated clamping means that the actuation of the control element to render one power means effective also renders the other power means ineffective.

19. In a machine tool, two clamping mechanisms; hydraulic means including two connected hydraulic motors for successively actuating said clamping mechanisms; a source of fluid pressure; conduits for successively connecting said source with said hydraulic motors; and valve means controlling the flow of fluid through said conduits, said valve means including a first valve adapted to direct said fluid to one of said hydraulic motors to move same to an effective position and a second valve, receiving fluid pressure escaping through a port uncovered by said first motor only when said first motor has been moved to its said effective position, to direct the said fluid to the other of said hydraulic motors.

20. A radial drill combining a column; an arm translatable on said column; a tool head translatably mounted on said arm; power actuated means to translate said arm; power actuated means to clamp said arm to said column; a single manual control for both of said power means, said control including a manually actuable lever having one position in which it renders the translating means ineffective and effects clamping of said arm and another position in which it renders said clamp means ineffective and effects translation of said arm; and automatic means for returning said lever to the first named position, comprising a spring element connected with said lever and normally tending upon release of the lever by the operator to return the lever to the position in which it effects clamping of said translatable element.

21. A machine tool combining a stationary support; a member translatable thereon; power means to clamp said member to said support; power means to translate said member along said support; a reversing mechanism embodied in said power means for determining the direction of translation of said member; a controller having two effective positions and one neutral position for said reversing mechanism; hydraulic means for actuating said controller selectively to either of its effective positions; and other hydraulic means interconnected with the power clamping means for automatically shifting said controller to a neutral position previously to the actuation of said clamp means to a clamped position.

LAWRENCE LEE SCHAUER.
AUGUSTUS MARIUS SOSA.